Feb. 16, 1960

C. H. MUELLER ET AL 2,925,075

FUEL INJECTION SYSTEM

Filed March 12, 1958

IDLING

Carl H. Mueller,
Jerome B. Wegmann,
Owen L. Bandy,
Inventors.
Koenig and Pope,
Attorneys.

Feb. 16, 1960 C. H. MUELLER ET AL 2,925,075
FUEL INJECTION SYSTEM
Filed March 12, 1958 5 Sheets-Sheet 2

ACCELERATION

RUNNING

Carl H. Mueller,
Jerome B. Wegmann,
Owen L. Bandy,
Inventors.
Koenig and Pope,
Attorneys.

DECELERATION

STATIONARY

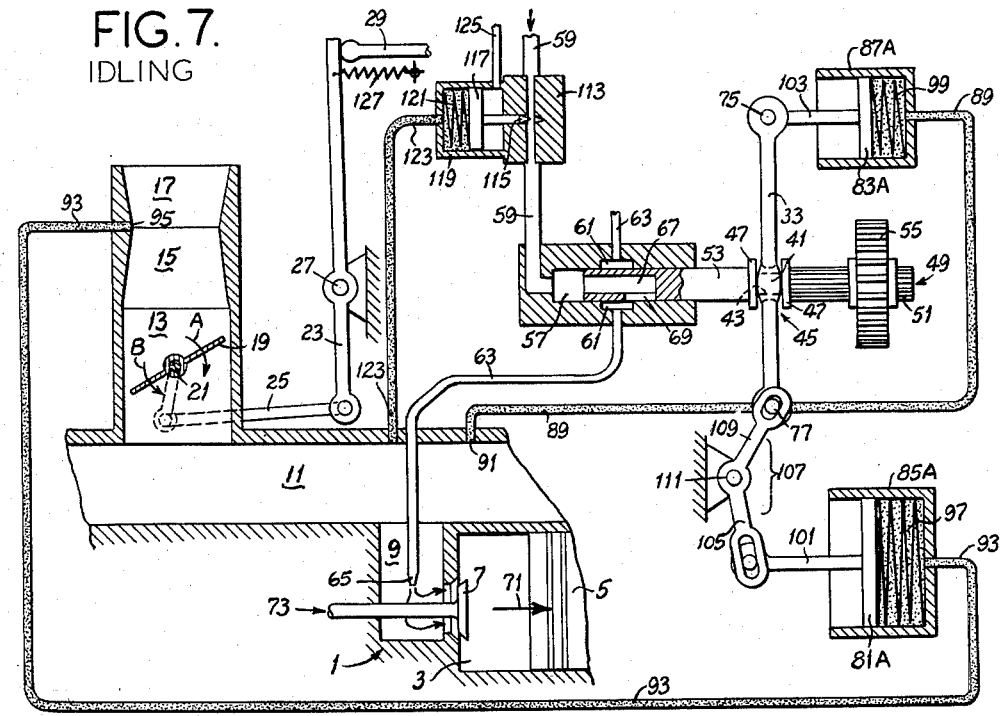
FIG.7. IDLING
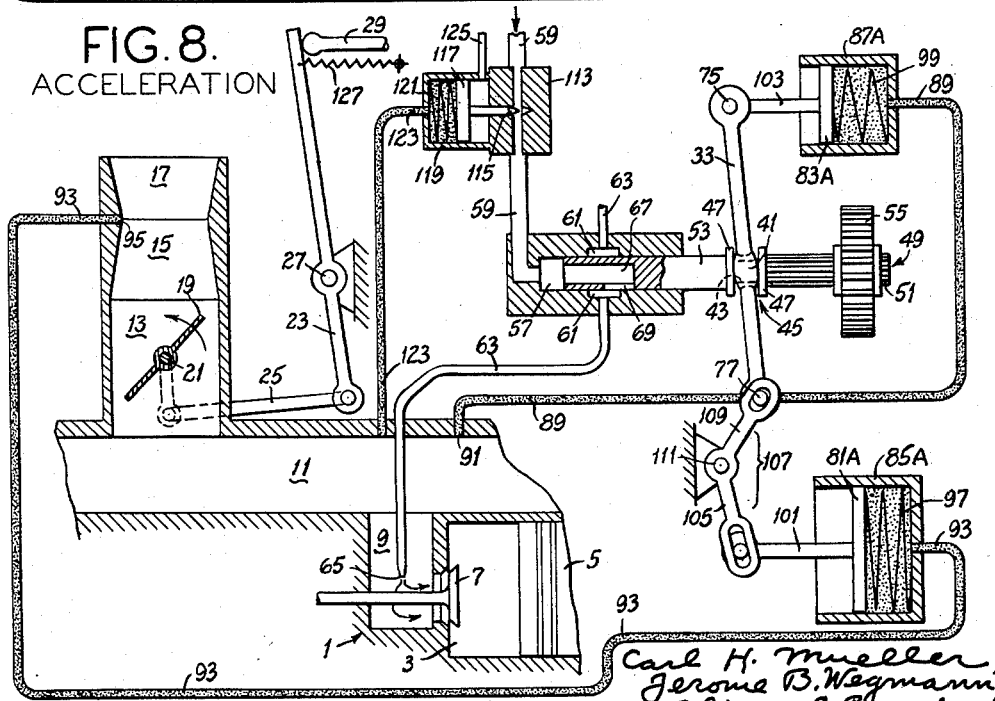
FIG.8. ACCELERATION

Feb. 16, 1960　　C. H. MUELLER ET AL　　2,925,075
FUEL INJECTION SYSTEM
Filed March 12, 1958　　5 Sheets-Sheet 5

RUNNING
(FULL-LOAD)

DECELERATION

Carl H. Mueller,
Jerome B. Wegmann,
Owen L. Bandy,
Inventors.
Koenig and Pope,
Attorneys

United States Patent Office 2,925,075
Patented Feb. 16, 1960

2,925,075

FUEL INJECTION SYSTEM

Carl H. Mueller, Pasadena Hills, Jerome B. Wegmann, Florissant, and Owen L. Bandy, St. Louis, Mo., assignors to The McNeil Machine and Engineering Company, Akron, Ohio, a corporation of Ohio Application March 12, 1958, Serial No. 720,945

15 Claims. (Cl. 123—140)

This invention relates to fuel injection systems, and with regard to certain more specific features, to such systems for internal combustion engines.

Among the several objects of the invention may be noted the provision of a fuel injection system adapted primarily, although not exclusively, for internal combustion engines operating upon the four-stroke cycle involving a suction stroke for introducing fuel into its cylinder or cylinders; the provision of a fuel injection system of the class described which in the case of a four-stroke cycle engine employs the usual intake manifold and valve-controlled venturi, but eliminates the usual carburetor parts such as critical float controls, compensating jets, valves and the like which are difficult to maintain at optimum operating efficiency; the provision of a fuel injection system of the class described which takes advantage of the variable ratios of pressures in an intake manifold and venturi for regulatory governing purposes while at the same time providing for independent manual control; and the provision of a system of the class described which may be arranged for application to two-stroke cycle engines and which may be designed readily for optimum operating efficiencies at all engine speeds of engines having any practical number of cylinders. Other objects and features will be in part apparent and in part pointed out hereinafter.

The invention accordingly comprises the elements and combinations of elements, features of construction, and arrangements of parts which will be exemplified in the structure hereinafter described, and the scope of which will be indicated in the following claims.

In the accompanying drawings, in which one of various possible embodiments of the invention is illustrated, Fig. 1 is a sectional diagram illustrating one form of the invention in engine-idling position;

Fig. 7 is a view similar to Fig. 1, but showing an alternative form of the invention under idling conditions; and, Figs. 8, 9 and 10 are views similar to Fig. 7 showing accelerating, full-load running and decelerating conditions, respectively.

Corresponding reference characters indicate corresponding parts throughout the several views of the drawings.

Figures 1, 2:
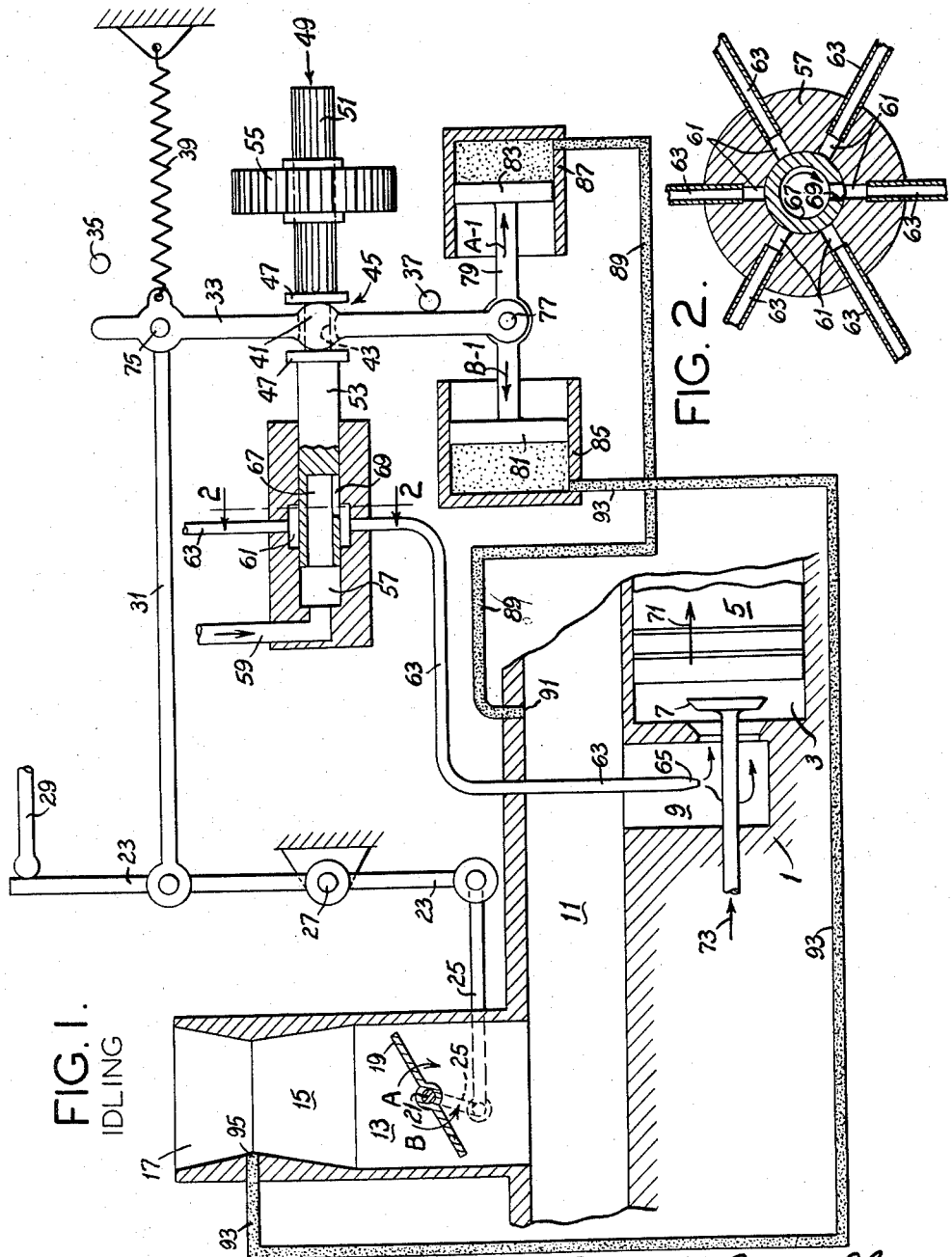
Fig. 2 is an enlarged cross section taken on line 2—2 of Fig. 1.

Referring to the drawings, numeral 1 indicates, for example, a multi-cylinder engine block, one cylinder of which is illustrated at 3 and one reciprocating piston of which is illustrated at 5. It will be understood that the piston 5 and all other pistons as may be in the engine are connected through suitable crank mechanisms to the engine crankshaft. The engine includes the usual camshaft operating at one-half the speed of the crankshaft for operating the usual exhaust and intake valves. The conventional engine parts, with the exception of the intake valves, are not illustrated, being well known. At numeral 7 is shown one of the intake valves which, through a pocket 9, has its inlet side connected with an intake manifold 11 in the block 1. It will be seen that functionally the pocket 9 may be said to be a portion of the intake manifold 11. This manifold connects through similar pockets 9 with other cylinders of the engine. At 13 is shown a venturi connected with the intake manifold 11 and having a throat portion 15. The throat inlet is shown at 17.

Below the venturi tube is a so-called butterfly control valve or throttle plate 19 of usual form, pivoted at 21 and adapted to be rotated from closed to open positions from a rocker bar or throttle lever 23. This is accomplished through pinned links 25. The lever 23 is pivoted at 27 and is adapted to be rocked by means of a primary control member 29, usually manually operated. A pinned link 31 connects the rocker 23 with a floating rocker bar 33, the latter being engageable and disengageable with several fixed stops 35 and 37. A return spring 39 normally biases the bar 33 toward the stops 35 and 37 and through link 31 biases the lever 23 clockwise against the control member 29. At its mid portion the bar 33 is provided with a yoke 41 surrounding the spindle 43 of a spool 45 having heads 47. Bar 33 may also be referred to as an integrating link, since, as will appear, it integrates or combines motion applied to it at different points into one motion at yoke 41 for moving spool 45.

The spool forms part of a control shaft 49, which at one end is splined as at 51 and at the other end is cylindric as at 53, the latter hereinafter referred to as a pump control plunger. The end 51 has a splined engagement with the inside splining of a gear 55, the latter being driven at a 1:1 speed ratio from the camshaft of the engine. By this means the control shaft 49 may be driven at camshaft speed in any axial position it may assume relative to the gear 55. The other cylindrical end 53 of the control shaft 49 fits into a cylinder 57 which has a communication 59 with the usual pressurized fuel supply system. Pressure is ordinarily supplied by a fuel pump (not shown) driven from the engine.

As shown in Fig. 2, the cylinder 57 is provided with peripherally spaced outlet ports in the form of slots 61, equal in number to the number of engine cylinders (six in the present example). Connected with these outlet slots 61 are fuel connections 63, one of which is shown completely in Figs. 1 and 3–6. Each connection 63 extends to a fuel spray nozzle 65 in one of the pockets 9 near one of the intake valves 7.

The cylindrical part 53 is formed at its end as a hollow cup 67, open at one end and closed at the other. Adjacent the closed end is a radial inlet port formed as a slot 69, preferably approximately equal in width to the width of each outlet port 61.

Registration of ports 61 and 69 depends upon both the angular and axial positions of the control shaft 49. The angular position of shaft 49 depends upon the angular position of gear 55, the engine camshaft and crankshaft and hence upon the position of the piston 5 in the cylinder 3. The arrangement is such that ports 61 and 69 come into register as the piston 5 retracts, as shown by the dart 71 thereon, and as opening of the intake valve 7 occurs (see dart 73). Upon registration of ports 61 and 69, fuel flows through them from the line 59, and then through a connection 63 to the appropriate spray nozzle 65. This provides a sprayed charge of fuel at the valve 7, which will be drawn in by the suction effected by the retracting piston 5.

The air required for combustion enters through the venturi tube 13, manifold 11 and pocket 9, being drawn into cylinder 3 along with the sprayed fuel. The amount of fuel supplied depends not only upon the radial angles subtended by the registering ports 61 and 69, but also upon the axial positions of the latter, and these axial positions depend upon the axial position of the control shaft 49. In turn, the axial position of shaft 49 depends upon the position of the floating rocker bar 33. The position of the bar 33 depends upon the positions of an upper pin 75 thereon connecting it with the link 31, and a lower pin 77 thereon connecting it with a cross connection 79 between pistons 81 and 83. These are slidable in vacuum-controlled cylinders or chambers 85 and 87. Obviously, the assembly 79, 81, 83 will move in response to any imbalance of pressure in the control cylinders 85 and 87. Balanced conditions occur when the imbalance is offset by reaction at pin 77. The control cylinder 87 communicates through line 89 with the intake manifold 11, as shown at 91; and control cylinder 85 communicates through line 93 with the venturi throat 15, as shown at 95. Cylinder 85 and piston 81 are larger than cylinder 87 and piston 83.

The angular adjustment of a valve such as 19 in a venturi tube such as 13 determines the air mass flowing through the venturi such as 15. The greater the rate of flow permitted (valve 19 open), the greater will be the air-mass induction or vacuum effect created by the venturi throat 15 at a connection such as 95. Therefore, the amount of vacuum in the vacuum-controlled cylinder 85 increases as the valve 19 opens. In other words, pressure decreases in cylinder 85 as valve 19 opens and the rate of air mass flowing through the venturi throat 15 increases.

On the other hand, the amount of vacuum in the intake manifold 11 decreases with opening of the valve 19, which is to say that pressure increases. In other words, the vacuum is improved with closure of the valve and deteriorates with opening of the valve. Thus as the valve 19 opens, the pressure in cylinder 87 rises, and as the valve closes, this pressure is reduced.

In view of the above, it will be apparent that upon moving the valve 19 clockwise toward closed position, as shown by dart A, the force tending to move the system 79, 81, 83 to the right (as shown by dart A-1) will be increased. That is to say, the available driving force on pin 77 will thereby be increased in the direction of A-1. On the other hand, upon moving the valve 19 anticlockwise toward open position, as shown by dart B, the force tending to move the system 79, 81, 83 to the left (as shown by the dart B-1) will be increased. That is to say, the available force on pin 77 will thereby be increased in the direction of B-1.

Operation is as follows, referring to Figs. 1, 3, 4, 5 and 6, which show idling, accelerating, running, decelerating and stationary positions, respectively.

Figure 6:
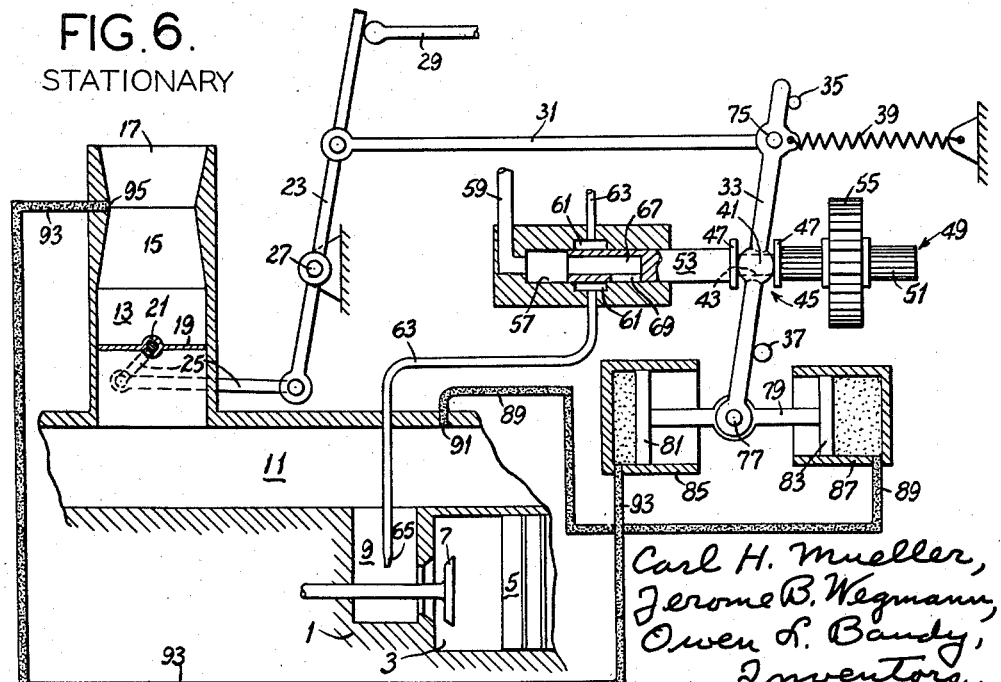

Considering first Fig. 1, the valve 19 has been moved from an initial position of rest (such as shown in Fig. 6) to a partially open position by movement to the left of the primary control member 29. This has resulted in movement of the upper end of the rocker 33 anticlockwise against action of the spring 39, with partial registration of port 69 with ports 61 as the plunger 53 rotates. The extent of registration is such that the amount of fuel delivered to each nozzle 65 is just sufficient to operate the engine under idling conditions. The relatively high vacuum or relatively low pressure transmitted to cylinder 87 from manifold 11, as compared to the relatively low vacuum or relatively high pressure transmitted to cylinder 85 from the throat 15, holds the lower end of the lever 33 against stop 37.

Figure 3:
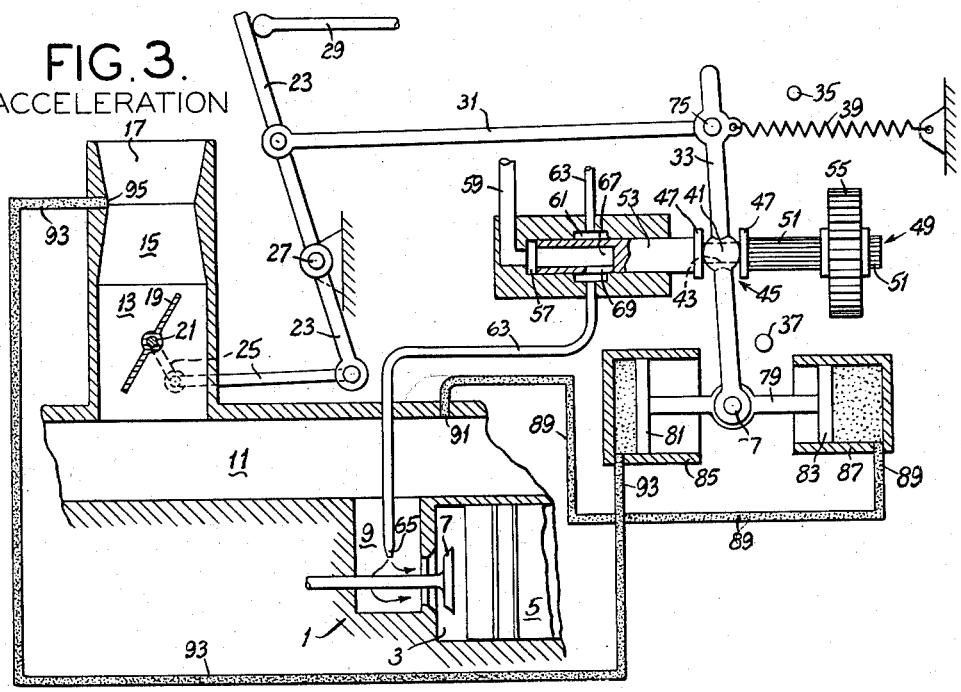
Figs. 3, 4, 5 and 6 are views similar to Fig. 1 but reduced in scale and showing engine-accelerating, running, decelerating and stationary positions, respectively.

In Fig. 3, positions of parts are shown under accelerating conditions, or in the alternative, under conditions of increased power requirements in order to accept a greater load at a given speed. In this case the throttle lever 23 has been moved further in a clockwise direction by the primary control member 29. This has further opened the valve 19 and initially moved the pump plunger 53 to the left for part of the distance shown. The new setting of valve 19 has increased the manifold pressure conveyed to cylinder 87 and has decreased the pressure conveyed to cylinder 85, resulting in the plunger 53 being moved to the left, thus enriching the fuel mixture because of increased axial registration of port 69 with ports 61. Against an insufficiently reactive or large load, the engine will accelerate with pressure increase in manifold 11 until stabilization of the pump plunger 53 is effected under conditions wherein the reactive forces balance. It will be understood that within the capacities of the engine, various loads may be carried at various speeds such as, for example, when an automobile driven by the engine traverses various grades.

Figure 4:
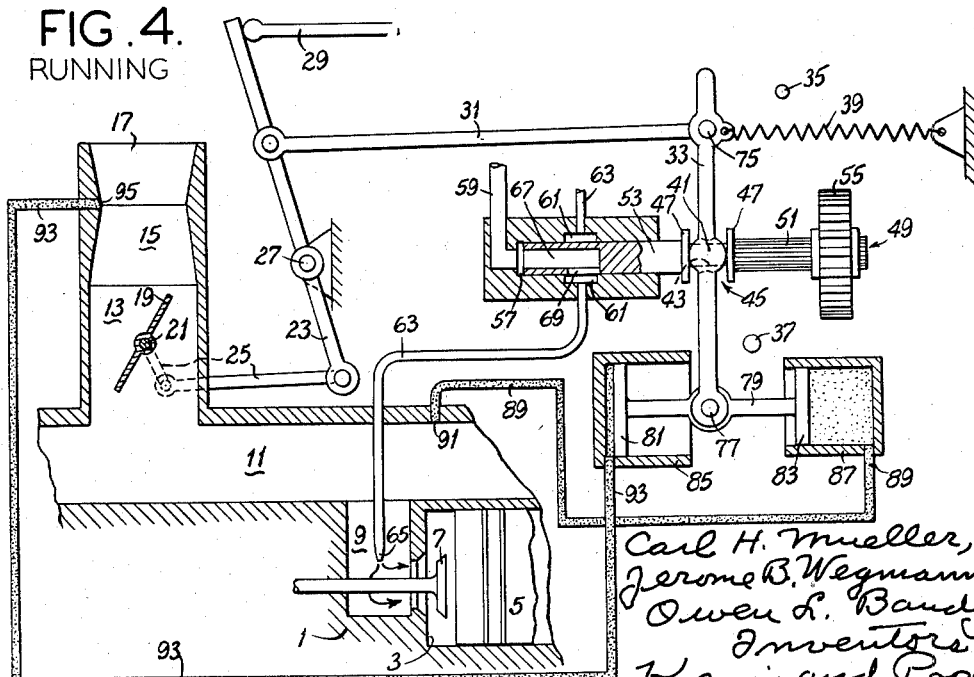

A high running speed condition (above idling) after acceleration is illustrated in Fig. 4. In this case the manifold pressure delivered to cylinder 87 from manifold 11 has increased, and the pressure delivered to cylinder 85 from 95 has decreased, thus moving plunger 53 further to the left. Under these conditions, the throttle 23 is in the proper position for the correct air-fuel ratio and volume of fuel required to maintain the speed desired.

Figure 5:
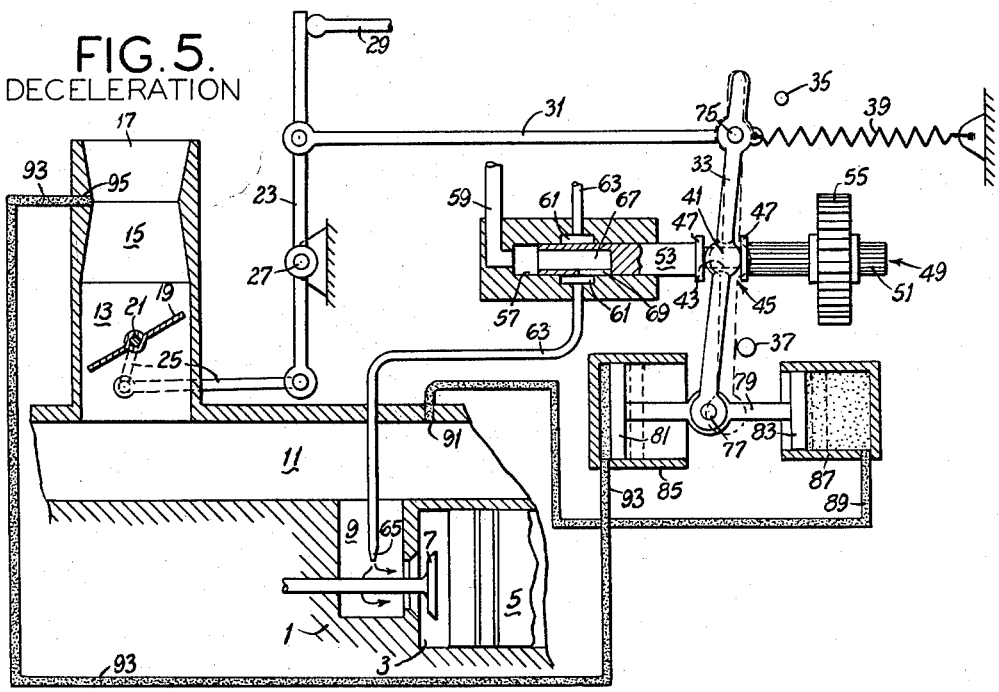

Fig. 5 shows the positions of parts under decelerating conditions, i.e., those in which the manual control member 29 is retracted, allowing spring 39 to rotate the throttle lever 23 clockwise. This moves the valve 19 toward closure and moves the pump plunger 53 to the right. As the engine slows, due to decrease in the fuel supply, the pressure delivered to cylinder 85 from 95 increases while the pressure applied to cylinder 87 from manifold 11 decreases. This will draw the assembly 79, 81, 83 to the right, pivoting on pin 75, until equilibrium is reached at a desired lower speed. The solid-line positions of parts in Fig. 5 have been selected to show a transient setting just after the control member 29 has been retracted but before the resulting pressure and the vacuum control actions in cylinders 85 and 87, respectively, have had their operative effects. As these effects occur, a subsequent transient position of the assembly 79, 81, 83 and of rocker 33 may be as shown by the dotted lines. The final position of equilibrium after deceleration will be between these positions with the port 69 open, although the port may have temporarily more nearly closed during the transient decelerating conditions. The exact final position will depend upon vacuum and pressure conditions that accord to the engine speed under equilibrium conditions with the throttle member 29 positioned as determined by the operator. Thus after deceleration, the parts may return from the Fig. 5 to the Fig. 1 idling position, for example. It is to the latter position that the dotted lines in Fig. 5 correspond. Corresponding dotted positions of the valve 19 and other connected parts in Fig. 5 are not shown for clarity and being also obvious.

The positions of parts when the engine is stationary are shown in Fig. 6, wherein the throttle control member 29 has been completely retracted, thus closing the valve 19, the engine ignition at this time being off. Levers 23 and 33 are moved clockwise by spring 39 until stop 35 is reached. Thereafter, lever 33 turns anticlockwise until stop 37 is reached. At this time the pump control plunger 53 is in a position wherein port 69 is out of registry with a port 61. When the engine is again started, the manually throttle member 29 is reset sufficiently leftward so as partially to register port 69 with a port 61 under cranking conditions. As the engine starts, the parts move toward the Fig. 1 position as the control member 29 is advanced to the left for idling operation.

In Figs. 7–10 is shown an alternative form of the invention, in which parts having like numerals to any of those above employed are essentially the same as the corresponding parts described in connection with the first form of the invention shown in Figs. 1–6. In the following any different numerals employed in relation to Figs. 7-10 refer to parts having alternative functions. In the alternative form, no link such as 31 is used between members 23 and 33. Moreover, the lines 89 and 93 extend to a different arrangement of control cylinders and pistons connected by a different arrangement with the integrating link 33.

Thus line 93 passes to a cylinder 85A and line 89 passes to a smaller cylinder 87A. Cylinders 85A and 87A contain pistons 81A and 83A, respectively, biased by means of springs 97 and 99, respectively. The pistons 81A and 83A carry piston rods 101 and 103, respectively, rod 103 being pin-connected at 75 with the link 33. Rod 101 is pinned to one arm 105 of a bell crank 107, the other arm 109 of which is pinned at 77 to the link 33. The bell crank is pinned at a stationary point by pin 111. In the line 59 is located a needle valve 113, the needle 115 of which is controlled by a piston 117 in a cylinder 119. The needle 115 is biased to a closed position by means of a spring 121 acting on piston 117. A vacuum connection 123 is made from the cylinder 119 (on the spring side of piston 117) to the manifold 11. An oil pressure connection 125 is made with the cylinder 119 on the needle side of the piston 117 to the oil pressure outlet of the oil pump of the engine which is being served by the pump and the injector system.

The operation of the alternative form of the invention shown in Figs. 7-10 is like that of the form shown in Figs. 1-6, with the following differences:

Upon operating the throttle control member 29, the valve 19 is actuated but in this form of the invention no motion is transferred directly from the member 23 to the link 33. Thus in this form the throttle control is independent of any mechanical connection with the vacuum control part of the system, which is of advantage in the application of the device to some physical forms of engines.

Under the idling conditions shown in Fig. 7, the effects of the venturi vacuum line 93 and of the manifold vacuum line 89 on pistons 81A and 83A is such as to place the integrating link 33 in the position shown in Fig. 7. In this position there is partial registration of port 69 with port 61 as the plunger 53 rotates. The extent of registration is such that the amount of fuel delivered to each nozzle 65 is sufficient to operate the engine under idling conditions. The springs 97 and 99 have spring rates adapted to accomplish this.

Accelerating conditions are shown in Fig. 8, wherein the member 23 has been rocked anticlockwise by the throttle control member 29, so as further to open the valve 19. This has the effect of reducing the vacuum in the manifold 11 and consequently in the manifold vacuum line 89. Thereupon spring 99 expands to move the member 33 anticlockwise, so as to initiate the registration between ports 69 and 61.

Figure 9:
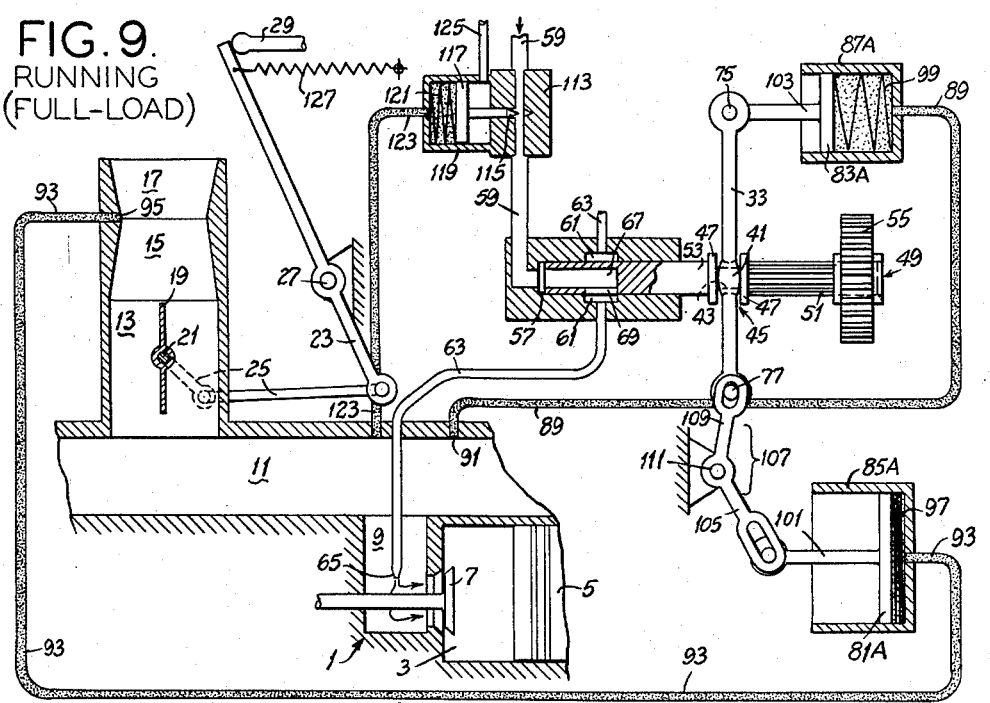

Fig. 9 shows a full-load running condition after acceleration, wherein the vacuum in manifold 11 is such that the spring 99 holds piston 83A outward (see vacuum connection 89). At the same time, the air mass flow through the venturi 15 increases, thus increasing the vacuum in the line 93, drawing piston 81A to the right. This rocks the bell crank 107 anticlockwise, thus further increasing registration between ports 69 and ports 61.

Figure 10:
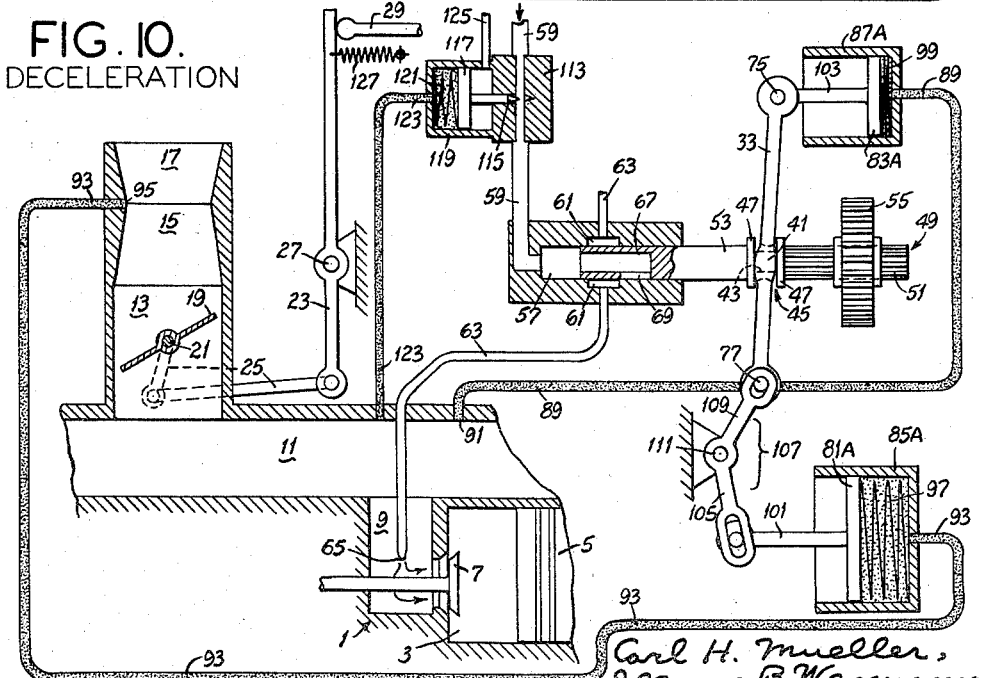

Referring to Fig. 10, decelerating conditions are shown in which the throttle member 29 is retracted. The member 23 then rocks clockwise under action of a return spring 127. This closes valve 19 and increases the vacuum in manifold 11 and, through connection 89, draws piston 83A against action of spring 99. Pivot 75 is therefore drawn to the right. At the same time, the air mass flow through the venturi 15 has decreased, thus decreasing the vacuum in the line 93, permitting spring 97 to force piston 81A to the left. This moves the bell crank 107 clockwise, thus throwing the pivot 77 to the right. The motions of pivots 75 and 77 to the right through link 33 result in port 69 being drawn out of registration with port 61. This starves the engine of fuel and it decelerates.

Another advantage of this form of the invention, in addition to elimination of the link 31 of the preferred form, is that the interposition of the bell crank 107 between piston 81A and member 33 provides for a better functional relationship between the action of member 33 and the vacuum changes in lines 89 and 93.

The purpose of the valve 113 is to provide an automatic shut-off when the engine stops. Thus when the engine is operating, pressure in line 125 obtained from the oil pump supplying oil pressure is applied beneath piston 117 to hold open the needle 115. Thus while the engine is operating, this oil pressure holds open valve 113.

On the other hand, oil pressure is not rapidly generated upon cranking an engine. However, the vacuum in manifold 11 is immediately generated upon cranking. This, through line 123, draws back the piston 117 to withdraw needle 115 and open valve 113 during starting action of the engine. Thereafter the oil pressure delivered through line 125 holds the valve open regardless of vacuum changes that may occur in the connection 123. When the engine stops, the spring 121 pushes needle 115 to its seat, thus closing valve 113 and preventing leakage of any fuel through ports 61 and 69 to the nozzle 65.

The assembly of parts 49, 57 (the former being driven by the gear 55) and the connections 59 and 63 may be referred to as a whole as a fuel distributor adapted to distribute and vary the amount of distribution. This occurs in joint response to the movement of the throttle control operating the valve 19 and to the movement of vacuum-controlled assembly 79, 81, 83. The chambers 85, 87 or 85A, 87A and their vacuum connections 89 and 93 may be generally referred to as a compensating vacuum control operating by differences in pressures generated by the venturi means 15, 95 and by the manifold 11. The parts 19, 25, 23 and 29 may be generally referred to as a primary control. The link 33 integrates the primary and compensating controls in their actions on the fuel distributor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be intrepreted as illustrative and not in a limiting sense.

We claim:

1. A fuel injection system for internal combustion engines having timed fuel intake means and an intake vacuum manifold connected with said fuel intake means; comprising a fuel nozzle in said manifold, venturi throat means connected with said manifold, a throttle valve between said throat means and the manifold controlling air flow to the fuel intake means, a movable throttle valve control, means movably responsive to differences in vacuum pressures in the venturi throat means and in the manifold, auxiliary control means connected with and movable in joint response to the movements of said movable means and said throttle valve control, a fuel distributor connecting a fuel supply with the fuel nozzle in said manifold and comprising means carrying at least one outlet port, means carrying an inlet port adapted upon movement in a first direction cyclically to connect with said outlet port and upon movement in a second direction to increase the registering areas between the inlet and outlet ports, and a member driven from the engine adapted to move in said first direction and connected with said auxiliary control means to move in said second direction.

2. A fuel injection system according to claim 1, wherein said means in the distributor carrying the outlet port is a cylinder and said means carrying the inlet port is an axially movable and rotatable cylinder therein.

3. A fuel injection system according to claim 2, wherein said rotatable cylinder is in the form of a hollow, cup-shaped plunger through the wall of which is formed said inlet port.

4. A fuel injection system for internal combustion engines having timed suction intake means; comprising an intake vacuum manifold connected with said suction intake means, a fuel nozzle in said manifold, a venturi throat means connected with said manifold, a throttle valve between said throat means and the manifold controlling air flow to the suction intake means, a movable throttle valve control, vacuum chambers respectively connected with said throat means and with said manifold, vacuum-controlled means connected for common movement and having pressure-responsive elements respectively exposed to the vacuum pressures in said vacuum chambers, a cylinder having at least one fuel outlet port connected with at least one fuel nozzle in said manifold, a rotary plunger connected interiorly with a fuel supply and having a fuel inlet port therefrom adapted cyclically to register with said outlet port, said plunger being movable axially to change the area of registration, driving means for rotating said plunger from the engine while accommodating axial plunger movement, and an auxiliary control member connected with said plunger for moving it axially while it rotates, said auxiliary control member being connected with said movable throttle valve control and with said vacuum-controlled means and movable in response to their joint movements.

5. A fuel injection system made according to claim 4, wherein said movable throttle valve control is constituted by a first rocker and said auxiliary control member is constituted by a second rocker linked to the first rocker and also linked to said vacuum-controlled means and having a yoked connection therebetween with said plunger, whereby both successive and simultaneous movements of the first rocker and of said vacuum-controlled means may be applied to said plunger while rotating.

6. A fuel injection system for internal combustion engines having timed suction intake means; comprising fuel distributor means having relatively rotatable ports adapted to be successively registered for timed distribution of fuel, said ports being relatively transversely movable for variation in the amount of fuel distributed upon each registration, means for conveying distributed fuel to said suction intake means, a vacuum intake manifold connected with said intake means, a venturi air inlet connected with said manifold, movable primary control means including a control valve between said venturi air inlet and said manifold, vacuum-operated compensating control means movable in response to pressure differences generated at said venturi air inlet and said manifold, means driven by the engine adapted to rotate said ports relatively, and transversely movable means adapted relatively transversely to move said ports while they rotate relatively, said transversely movable means being responsive to movements both of said primary control means and of said vacuum-operated compensating control means.

7. A fuel injection system for internal combustion engines having timed suction intake means; comprising fuel distributor means having relatively rotatable ports adapted to be successively registered for timed distribution of fuel to said intake means, said ports being also relatively axially movable for variation in the amount of fuel distributed upon each registration, means for conveying distributed fuel to said suction intake means, a vacuum intake manifold connected with said intake means, a venturi air inlet connected with said manifold, said inlet having a region at which a vacuum is induced by the air mass flow through the inlet, movable primary control means including a control valve between said venturi air inlet and said manifold, vacuum-operated compensating control means separately connected with and movable in response to pressure differences generated at said venturi inlet region and in said manifold, means driven by the engine adapted to rotate said ports relatively, and axially movable means adapted relatively axially to move said ports while relatively rotating, said axially movable means being responsive to movements both of said primary control means and of said vacuum-operated compensating control means.

8. A fuel injection system made according to claim 7, wherein said axially movable means is constituted by a rocking member having first and second connections with said primary control means and compensating control means, and including an intermediate third connection with said fuel distributor means, whereby differential movements between said first and second connections may be transmitted to said third connection.

9. A fuel injection system for internal combustion engines having timed suction intake means; comprising fuel distributor means having a relatively rotatable cooperating cylinder and a plunger both containing ports adapted to be successively registered for timed distribution of fuel, said plunger being relatively axially movable for variation in the amount of fuel distributed through said ports upon registration, means for conveying distributed fuel to said suction intake means, a vacuum intake manifold connected with said intake means, a venturi inlet connected with said manifold, movable primary control means including a control valve between said venturi inlet and said manifold, compensating vacuum-operated control means movable in response to pressure differences generated at said venturi inlet and said manifold, means driven by the engine adapted to rotate said plunger, and movable rocker means adapted relatively axially to move said ports while relatively rotating, said rocker means being responsive to movements both of said primary control means and of said compensating control means.

10. A fuel injection system for an internal combustion engine having a vacuum intake manifold supplied with air through a venturi inlet controlled by a throttle valve operated from a throttle linkage; comprising a fuel inlet in the manifold, a rotatable and axially movable fuel distributor and control valve in said fuel inlet, an integrating rocker link controlling axial movement of said valve, first and second vacuum control means adapted to apply opposite movements to said link for axial control of said valve, and vacuum connections from the venturi inlet and the vacuum manifold to said vacuum control means respectively.

11. A fuel injection system according to claim 10, including an operative mechanical connection between said throttle linkage and said link.

12. A fuel injection system for an internal combustion engine having a vacuum intake manifold supplied with air through a venturi inlet controlled by a throttle valve operated from a throttle linkage; comprising a fuel inlet in the manifold, a rotatable and axially movable fuel distributor and control valve in said fuel inlet, an integrating rocker link controlling axial movements of said valve, first and second vacuum control means adapted to apply different movements to said link, said link being adapted to combine said movements for application to and axial control of said valve, and vacuum connections from the venturi inlet and the vacuum manifold to said vacuum control means respectively.

13. A fuel injection system according to claim 12, wherein the connection between one vacuum control means and the rocker member is constituted by an intermediate linkage.

14. A fuel injection system according to claim 13, wherein said intermediate linkage is constituted by a pinned bell crank.

15. fuel injection system for an internal combustion engine having a vacuum intake manifold supplied with air through a venturi inlet controlled by a throttle valve operated from a throttle linkage; comprising a fuel inlet in the manifold, a rotatable and axially movable fuel distributor and control valve in said fuel inlet, an integrating rocker link controlling axial movement of said valve, first and second vacuum control means adapted to apply opposite movements to said link for axial control of said valve, vacuum connections from the venturi inlet and the vacuum manifold to said vacuum control means respectively, fuel supply means for said fuel distributor and control valve, a vacuum-controlled cut-off valve in said fuel supply means adapted to open in response to vacuum increase, and a vacuum connections from said vacuum-controlled cut-off valve and said vacuum intake manifold.

References Cited in the file of this patent

UNITED STATES PATENTS

| | | |
|---|---|---|
| 2,384,282 | Chandler | Sept. 4, 1945 |
| 2,453,329 | Lee | Nov. 9, 1948 |
| 2,516,147 | Robinson | July 25, 1950 |

FOREIGN PATENTS

| | | |
|---|---|---|
| 1,010,566 | France | Mar. 26, 1952 |